Figure 1:
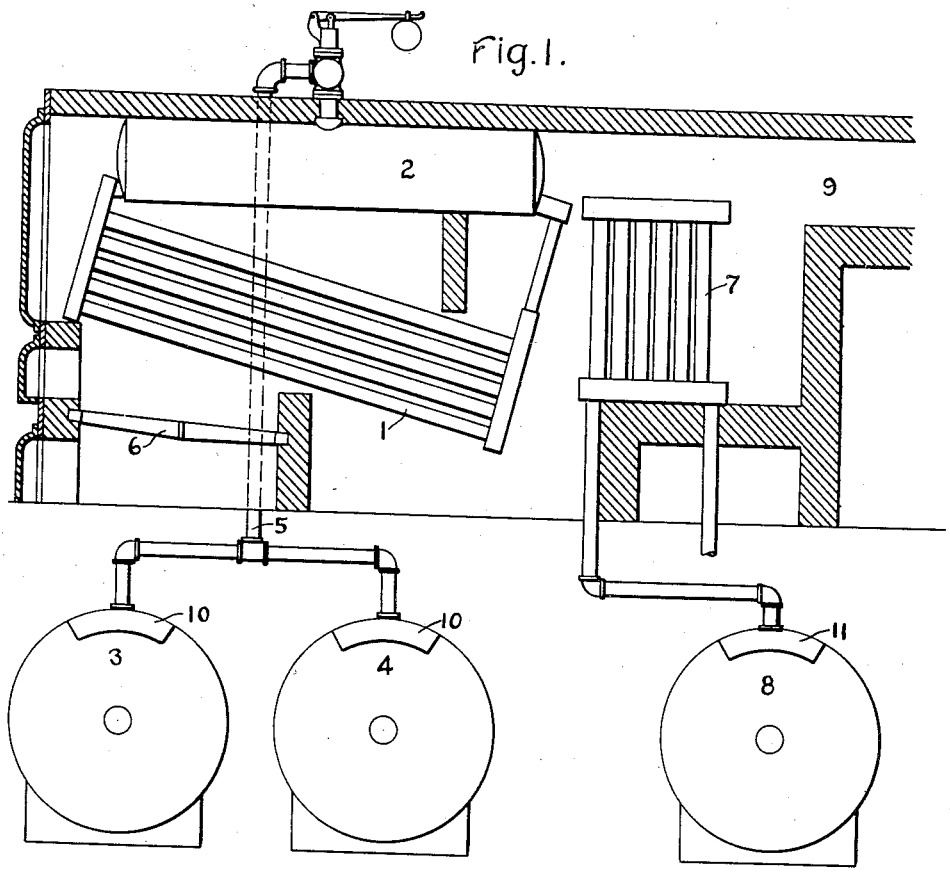

No. 822,673. PATENTED JUNE 5, 1906.
H. KELLER.
GOVERNING MECHANISM FOR PRIME MOVERS.
APPLICATION FILED FEB. 1, 1905.

3 SHEETS—SHEET 1.

Witnesses:
Helen Orford
Alex. F. Macdonald

Inventor,
Huldreich Keller,
By Albert G. Davis
Att'y.

No. 822,673. PATENTED JUNE 5, 1906.
H. KELLER.
GOVERNING MECHANISM FOR PRIME MOVERS.
APPLICATION FILED FEB. 1, 1905.
3 SHEETS—SHEET 2.
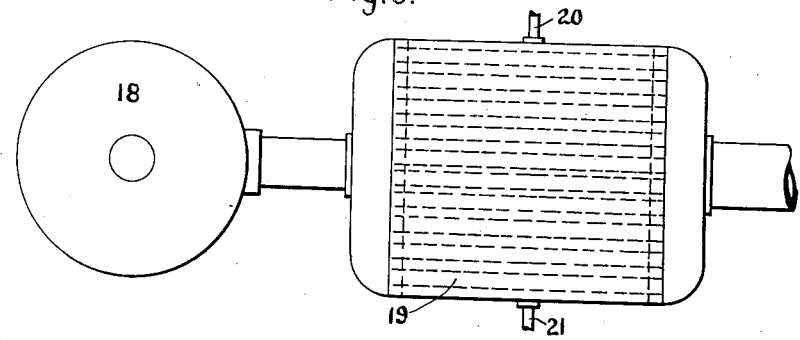
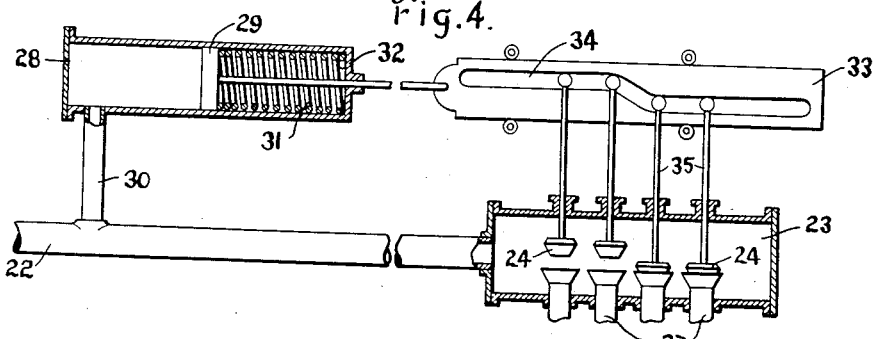
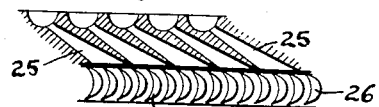
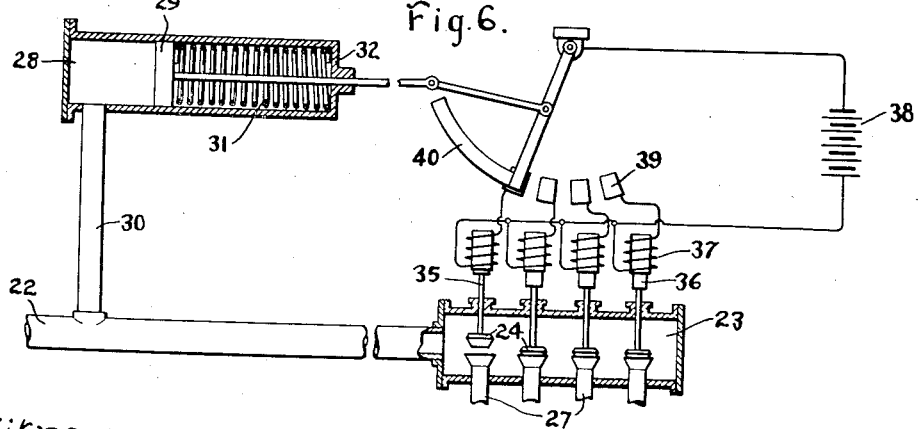
Witnesses:
Helen Clifford
Alex. F. Macdonald
Inventor,
Huldreich Keller,
By Albert E. Dean
Att'y.

No. 822,673.  
PATENTED JUNE 5, 1906.

H. KELLER.
GOVERNING MECHANISM FOR PRIME MOVERS.
APPLICATION FILED FEB. 1, 1905.

3 SHEETS—SHEET 3.

Witnesses:
Helen Oxford
Alex. F. Macdonald.

Inventor,
Huldreich Keller:
By Albert G. Davis
Att'y.

UNITED STATES PATENT OFFICE.

HULDREICH KELLER, OF BERLIN, GERMANY, ASSIGNOR TO GENERAL ELECTRIC COMPANY, A CORPORATION OF NEW YORK.

GOVERNING MECHANISM FOR PRIME MOVERS.

No. 822,673. Specification of Letters Patent. Patented June 5, 1906.

Application filed February 1, 1905. Serial No. 243,692.

*To all whom it may concern:*

Be it known that I, HULDREICH KELLER, a citizen of Switzerland, residing at Berlin, Germany, have invented certain new and useful Improvements in Governing Mechanisms for Prime Movers which Utilize Energy from a Fluctuating Source of Supply, of which the following is a specification.

It has heretofore been proposed to increase the economy of power generation by utilizing the heat of the exhaust-steam from a steam-engine or the heat of the waste gases of a gas-engine or other waste heat from a prime mover to raise steam either from water or from some liquid of lower boiling-point than water and to utilize this steam in a steam-turbine or steam-engine.

In general whenever it is attempted to operate a steam-engine or steam-turbine from waste heat in any such manner as above described it is found that the amount of waste heat, and therefore the pressure in the boiler heated by such waste heat, will vary from time to time. For example, if the waste heat is derived from the exhaust heat of a steam-engine or from the flue-draft gases of a boiler or set of boilers the amount of waste heat available will vary with the variations in the amount of work done by the system. It will therefore be difficult to maintain economical conditions in the auxiliary or waste-heat turbine or engine, since any engine or turbine is designed for a certain pressure at which it runs with the greatest economy and must have a less economy at any other pressure. In the past attempts have been made to govern the waste-heat engines in such way as to maintain constant speed, such speed being desirable for most uses to which prime movers are put—as, for example, when the prime movers are used for driving electric generators—and such a system of governing led to violent changes in pressure and to loss of economy.

The object of the present invention is to obviate these difficulties and to so arrange matters that the waste-heat engine runs at a proper speed and at the same time is furnished with constant pressure or a pressure adapted for economical operation and is so governed as to take at all times as much waste heat as is available, thereby conducing to the greatest possible economy in the system.

In carrying out the invention one or more boilers are provided, which for convenience are termed "primary" boilers, and one or more boilers termed "secondary" boilers, which are heated by the flue-gases from the primary boilers or by the exhaust from one or more prime movers. Receiving steam or other elastic fluid from the primary boiler or boilers are one or more prime movers, and receiving steam or other vapor energy from the secondary boiler or boilers are one or more secondary prime movers, such as turbines. At least one primary and one secondary prime mover are preferably connected to a common load, since a prime mover of ordinary construction receiving vapor from a fluctuating source is not adapted to drive an individual load of the usual character. By preference all of the prime movers are provided with electric generators, which may be connected to the same bus-bars. With this arrangement the speed of the secondary prime mover or movers will be maintained within the permissible range, and it or they will supply the energy developed thereby, whatever it may be, to the system. Under certain conditions, however, the secondary prime mover may be provided with a speed-governor and drive an individual load.

Each of the primary turbines is provided with the usual governing mechanism, which is responsive to load changes. It is evident after a given condition as to pressure on a primary boiler has prevailed for some time that the temperature of the flue-gases supplied to the secondary boiler may increase, resulting in an increased pressure on said boiler. If the pressure in the boiler rises still farther, it may endanger it or the apparatus connected thereto. In order to prevent this excess pressure and also to operate the turbine under conditions of high efficiency, a regulating mechanism is provided between the secondary boiler, whatever its source of heat may be, and each turbine receiving vapor therefrom, which is responsive to pressure changes. Included in said mechanism in the preferred form of the invention are means which vary the volume of vapor discharged against the buckets of the secondary turbine without varying its velocity. In this connection it is to be noted that the regulating mechanism differs from those heretofore used for regulating prime movers, in that it increases the supply of vapor to the prime mover as the pressure of the source, whatever it may be, rises and decreases the supply as the pressure of said source falls off. Where a turbine of the jet or impact type having expanding or other nozzles is employed as the secondary turbine, it is preferable to use the type of governing mechanism specified; but the invention in its broader aspects is not to be construed as limited to any particular type of turbine or to any particular type of valve mechanism for regulating the admission of fluid thereto.

As a specific embodiment or illustration of the invention a motor responsive to pressure changes in the secondary boiler is shown, which is connected to a secondary device, such as a cam-bar or its equivalent, and the latter controls the opening and closing of individual nozzle-valves, or the secondary device may act through electrical devices to accomplish the desired result. When the secondary boiler is heated by the exhaust from a prime mover, its pressure tends to fluctuate to a greater extent than where it is heated by flue-gases. Hence the need of a proper governing mechanism is greater.

One or more generators driven by primary turbines should in the preferred form of the invention be connected to the same circuit as that driven by the secondary turbine, and any tendency for the latter to change its speed is instantly arrested by the current flowing in said circuit. In other words, the primary generator will under these conditions tend to hold the secondary generator in synchronism therewith. It will thus be seen that the secondary turbine and its generator will perform an amount of work corresponding to the energy received from its boiler, and this in an efficient manner, because of its governing mechanism, while the primary turbine and its generator hold the speed at the proper point.

It will be seen that the amount of vapor taken from the secondary boiler is regulated by the heat supplied to the latter, and therefore the valve or valves controlling the admission of vapor to the secondary prime mover is or are so arranged that an increase in the amount of heat delivered to the boiler causes an increase in the ported area of admission to the prime mover, and vice versa.

Figure 2:
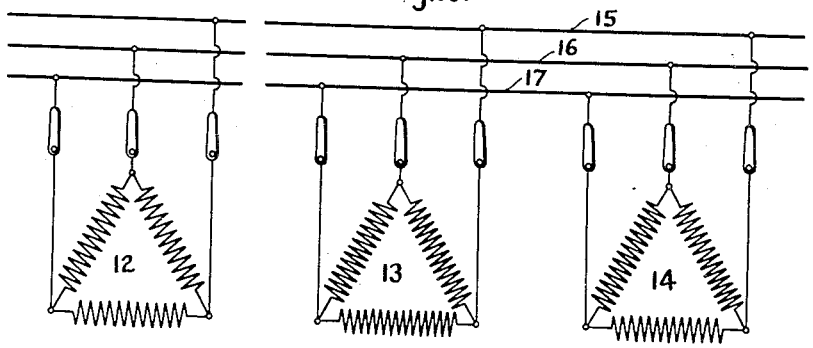
Figure 7:
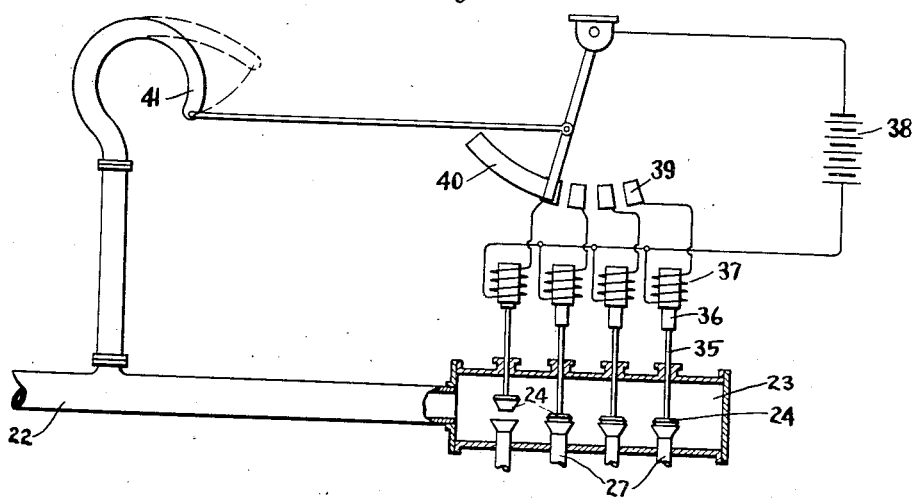
Figure 8:
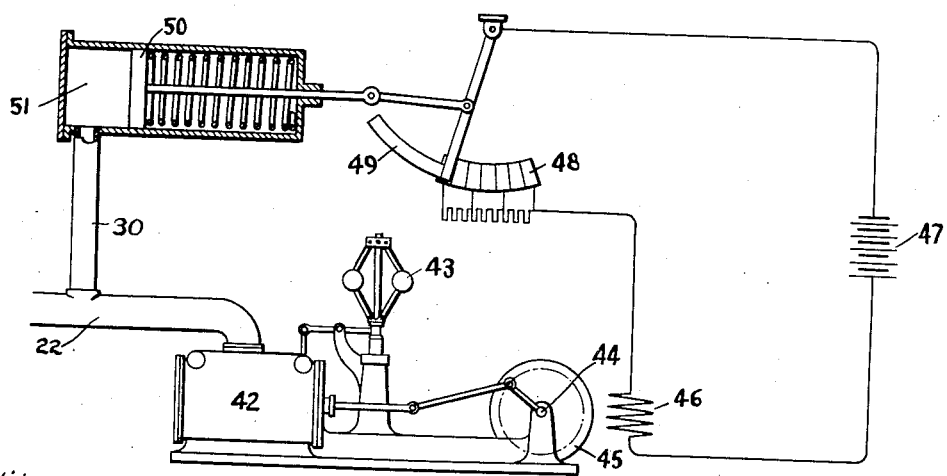

In the accompanying drawings, which illustrate certain embodiments of the invention, Figure 1 is a diagrammatic view showing primary and secondary prime movers receiving vapor energy from primary and secondary boilers, the secondary boiler being heated by the flue-gases from the primary boiler. Fig. 2 is a diagram showing certain of the circuit connections of the generators. Fig. 3 is a diagrammatic view showing a secondary boiler heated by the exhaust from a primary prime mover, such as a turbine. Fig. 4 is a diagrammatic view of one form of governor mechanism for controlling the admission of vapor to the secondary turbine. Fig. 5 is a detail view showing the nozzles and wheel-buckets of the primary and secondary turbines. Fig. 6 is a diagrammatic view illustrating a governing mechanism for the secondary turbine wherein a relay mechanism is employed. Fig. 7 is a diagrammatic view of the governing mechanism for the secondary turbine, illustrating a modification in the means employed to open and close the circuits of the magnets controlling the nozzle-valves; and Fig. 8 shows a modified form of governing mechanism wherein the resistance is varied in the exciter-circuit of the generator driven by the secondary engine.

Referring to Fig. 1, 1 represents a boiler of suitable construction, which is connected to a steam drum or chamber 2, from which steam is supplied to the turbine 3 and 4 by the conduit 5. The boiler is provided with the usual fuel-receiving grate 6 or it may be heated by any other means, such as hydrocarbon burners. Situated in the rear of the primary boiler is a secondary boiler 7, that is arranged to supply vapor to the secondary turbine 8. This boiler is heated by the flue-gases from the primary boiler as they pass to the conduit 9, leading to the stack. Each of the primary turbines is provided with a valve mechanism 10, that is under the control of a load-responsive device, such as a shaft-governor. The secondary turbine is provided with a governing mechanism 11, which is responsive to changes in pressure in the secondary boiler, and this construction will be more fully described hereinafter.

In Fig. 2 the windings of the generators which are driven by the turbines are indicated at 12, 13, and 14. In the present illustration the generators are of the alternating-current three-phase type and are connected to the conductors or bus-bars 15, 16, and 17 by suitable switches. All of the generators may be connected to the same bus-bars or a less number. It is important, however, to have at least one generator driven by a primary turbine connected with a generator driven by a secondary turbine, so that the speed of the latter may be kept at the same speed as the primary generator. By reason of this arrangement the use of a speed-governor of the secondary turbine is obviated.

In Fig. 3 is shown a primary turbine or other prime mover, such as a gas-engine 18, the exhaust from which is employed to supply heat to the secondary boiler 19. The boiler may be of any suitable construction, and connected therewith are pipes 20 and 21, one being the discharge and the other the receiving pipe.

Referring to Fig. 4, 22 represents the pipe leading from a secondary boiler to the valve-chest 23 of a secondary turbine, which contains one or more separately-actuated valves 24. Each of these valves controls the admission of steam or other elastic fluid to the sections 25 of the nozzle shown in Fig. 5. Cutting these sections into and out of service will vary the volume of vapor delivered to the bucket-wheel 26 without varying its velocity. The passages 27 convey motive fluid from the valve-chest 23 to the bowls of the nozzles 25. Situated at a convenient point with respect to the conduit 22 is a motor comprising a cylinder 28 and a piston 29. The piston is subjected to the pressure of the vapor in the pipe 22, the vapor being conveyed to the cylinder by a pipe 30. The opposite side of the piston is subjected to the pressure of a spring 31, which is seated on the fixed abutment 32. To the piston is connected a cam-bar 33, the latter being suitably guided and provided with a cam-slot 34 of any desired shape. Located in the cam-slot are rollers, each of which is connected to a valve-stem 35. From the construction shown it is evident that as the cam-bar is moved to the right it will open the valves 24 one after the other, and when moved to the left by reason of the force exerted by the spring 31 overcoming the pressure within the cylinder to a greater or less extent the valves will close one after the other. The shape of the cam-slot may be such that the valves will open wide by a very short movement of the cam-bar, in which case throttling of the vapor to the nozzle-passages will be virtually eliminated. On the other hand, the cam-bar may be so arranged that the valves will open slowly, in which case there will be more or less throttling of the fluid, depending upon the position of the valves. The latter arrangement is the one shown in the drawings. It is evident that for every value of the vapor-pressure existing in the conduit 22 there will be a given position for the piston 29, and hence the cam-bar. If the amount of heat supplied to the secondary boiler is increased, the pressure in the conduit 22 will correspondingly increase and displace the piston to the right, and a decrease in the amount of heat supplied to the secondary boiler will decrease the pressure in the conduit 22, and the spring 31 will force the piston to the left.

In Fig. 6 is shown a slight modification of the invention, wherein each of the valves 24 is attached to an armature 36, the latter being acted upon by a magnet-coil 37. The several magnet-coils are connected to a suitable source of supply 38 and to contacts 39. Pivotally supported for movement over these contacts is an arm 40. The movements of this arm are controlled by a piston 29 and spring 31 of the same character as described in connection with Fig. 4. The vapor is supplied to the secondary turbine by the conduit 22, and the space back of the piston is subjected to the pressure of the secondary boiler by means of the pipe 30. This arrangement differs from the one previously described, in that the work of opening the valves is done by the electric energy from the source 38. All the work the piston 29 has to do is to move the contact-arm 40 back and forth over the fixed contacts 39 in accordance with changes in pressure on the secondary boiler. The valves may be arranged to seat themselves by the pressure to which they are subjected or by springs or other suitable means. The action of the valves is the same as described in connection with Fig. 4. Hence further description is unnecessary.

Referring to Fig. 7, a different type of motor is shown for moving the contact-arm 40. It comprises a pipe or conduit having a flexible end 41, which describes a certain path in response to changes in pressure in the conduit 22 after the manner of a manometer. As the position of the free end changes it moves the contact-arm 40 back and forth over the fixed contacts 39. In the arrangements previously described the speed of the secondary prime mover has been controlled by the speed of the other prime mover to which it is connected. Under certain circumstances the secondary prime mover may be provided with a speed-governor in addition to a governing mechanism for varying the supply of vapor thereto in accordance with changes in pressure on the secondary boiler. In Fig. 8 such an arrangement is shown. 42 represents a reciprocating engine of suitable construction, which is provided with a governor 43, that is responsive to speed changes and varies the period of cut off of the admission-valves in the ordinary manner. The piston is connected to the main shaft 44, which shaft also drives the revolving element of the generator 45. 46 represents the field-magnet coil of the generator, and 47 a separate source of electric energy for exciting the field-magnets. In circuit with the source of supply and the field-magnets is a rheostat 48 of suitable construction, which is arranged to vary the amount of current passing through the field in accordance with changes in pressure on the secondary boiler. The rheostat is provided with a contact-arm 49, that is actuated by a piston 50, located in the cylinder 51. One side of the piston is subjected to the pressure of vapor in the conduit 22, while the other side is subjected to that of a compression-spring located within the cylinder. As the pressure in the conduit 22 changes it is evident that the piston 50 will assume different positions and introduce more or less resistance into the circuit of the field-magnet. As the resistance varies the excitation of the generator will be increased or diminished, and in consequence thereof the output of the generator will vary and the number of revolutions of the main shaft 44 will increase or diminish, as the case may be. The speed-responsive device 45 will adjust the inlet-valves of the engine, so that the cylinder will be filled to a greater or less extent on each stroke of the piston, and thereby maintain the pressure in the boiler constant, or substantially so. By reason of the arrangement described the steam-engine, although it operates with varying amounts of vapor, is subjected to an almost constant steam-pressure, which is best suited for its proportions. The same arrangement can be used in connection with a turbine, and more advantageously, since a turbine ordinarily works with a definite ratio of expansion.

I have described the valve mechanism in Figs. 4, 6, 7, and 8 as being useful in connection with prime movers receiving motive fluid from a secondary boiler; but it is evident that the said mechanism is not necessarily limited in its application to the particular means employed to produce the supply of motive fluid.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. In combination, a source of vapor energy, a prime mover receiving vapor therefrom, a second prime mover the supply of vapor to which is responsive to load changes on the first prime mover, and a governing mechanism for the prime mover, which increases the amount of vapor admitted thereto as the pressure of the source rises and decreases it as the pressure of the source falls.

2. In combination, a source of vapor-supply which is heated by a fluctuating source, a prime mover receiving energy therefrom, a governing mechanism which admits more vapor to the prime mover as the pressure of the source rises and cuts it off as it falls, and a separate means for controlling the speed thereof.

3. In combination, a source of vapor-supply which is heated by a fluctuating source, a prime mover receiving energy therefrom, one or more other prime movers, two or more of said prime movers being connected to a common load, and a governing mechanism for the first-mentioned prime mover which is responsive to pressure changes in the source of supply.

4. In combination, a source of vapor-supply the pressure of which tends to fluctuate, a prime mover receiving energy therefrom, a governing mechanism which holds the pressure of said source substantially constant by admitting more or less vapor to the prime mover, and a second prime mover which acts as a speed-governor for the first.

5. In combination, a source of vapor energy which tends to fluctuate, a turbine receiving energy therefrom, and a plurality of separately-actuated valves which open in a predetermined sequence as the pressure of the vapor source rises, and close as the pressure decreases.

6. In combination, a high-pressure source of vapor-supply, a turbine connected to said source, a secondary or low-pressure turbine the vapor-supply for which varies with the load on the high-pressure turbine, and a governing mechanism for the low-pressure turbine which governs the efficient admission of vapor thereto but does not govern its speed.

7. In combination, a prime mover, a source of vapor-supply, the pressure of which tends to fluctuate with changes in load of the prime mover, a turbine receiving vapor therefrom, a valve which governs the efficient admission of vapor to the turbine without regard to the speed, and a motor which is responsive to pressure changes in the source of vapor-supply for operating the valve.

8. In combination, a source of vapor-supply, the pressure of which tends to fluctuate, a turbine receiving vapor therefrom, valves which admit more or less vapor to the turbine but do not govern its speed, and means responsive to changes in the amount of heat supplied to the source for operating the valves in a predetermined sequence.

9. In combination, a source of vapor-supply, the pressure of which tends to fluctuate, a turbine receiving vapor therefrom, one or more turbines, generators driven by the turbines, which are connected together, and a governing mechanism for the first-mentioned turbine which governs the efficient admission of vapor thereto without governing its speed.

10. In combination, a primary vaporizer, a secondary vaporizer heated by the flue-gases from the first, a generator which carries the main load, a second generator connected in circuit with the first, a turbine for driving the second generator, which receives vapor from the secondary vaporizer, and a governing mechanism which responds to changes in pressure in the secondary vaporizer and admits more vapor to the turbine when the pressure increases and decreases it when the pressure falls.

11. In combination, a source of vapor-supply, a high-pressure prime mover, a secondary or low-pressure turbine, and a governing mechanism for admitting fluid to the low-pressure turbine which increases and decreases the ported area thereof as the pressure of the fluid delivered thereto varies.

12. In combination, a prime mover, a vaporizer in which the pressure tends to fluctuate as the load of the prime mover fluctuates, a prime mover receiving energy therefrom, and successively-operating valves which are sensitive to pressure changes in the vaporizer for increasing or decreasing the admission of vapor to the prime mover.

13. In combination, a prime mover having a suitable governing mechanism, a second prime mover adapted to receive energy from a source fluctuating with the load on the first, electric generators driven by the prime movers, and electrical connections extending between the generators for causing them to operate at predetermined speeds.

14. In combination, a prime mover having a suitable governing mechanism for regulating its speed, a second prime mover adapted to receive energy from a fluctuating source of supply, a governing mechanism for the second prime mover which governs the efficient admission of vapor thereto without governing its speed, electric generators driven by the prime movers, and a means connecting the generators in a manner to preserve predetermined speed relation of the prime movers and generators.

15. In combination, a secondary or low-pressure prime mover adapted to receive vapor energy from a fluctuating source of supply, independent fluid-admitting devices for the prime mover, with a governing mechanism which increases the amount of vapor energy admitted to the prime mover by opening said devices one after the other when the pressure of the source of supply rises and decreases the amount of energy admitted when the pressure of the source falls, by closing the devices one after the other.

16. In combination, a prime mover adapted to receive vapor energy from a fluctuating source of supply, with a governing mechanism comprising a plurality of independent and successively-operated valves which open one after the other and admit fluid to the prime mover as the pressure of the source rises, and close one after the other to decrease the amount of fluid admitted to the prime mover as the pressure of the source falls.

In witness whereof I have hereunto set my hand this 14th day of January, 1905.

HULDREICH KELLER.

Witnesses:
WOLDEMAR HAUPT,
HENRY HASPER.